United States Patent
Yamazaki et al.

(10) Patent No.: US 6,182,445 B1
(45) Date of Patent: Feb. 6, 2001

(54) EXHAUST SWITCH-OVER VALVE MALFUNCTION DETECTION SYSTEM OF INTERNAL COMBUSTION ENGINE

(75) Inventors: Hideharu Yamazaki; Yuji Yasui; Takashi Haga; Katsumi Saito; Yoshihisa Iwaki, all of Wako (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/498,654

(22) Filed: Feb. 7, 2000

(30) Foreign Application Priority Data

Feb. 8, 1999 (JP) .................................. 11-030251

(51) Int. Cl.$^7$ ........................................ F01N 3/00
(52) U.S. Cl. .................. 60/277; 60/274; 60/324; 137/551
(58) Field of Search .............. 60/277, 324, 293, 60/287, 288, 289, 291, 295, 284, 274; 137/551

(56) References Cited

U.S. PATENT DOCUMENTS

| | | | |
|---|---|---|---|
| 5,349,816 | * 9/1994 | Sanbayashi et al. | 60/277 |
| 5,706,653 | * 1/1998 | Shoji et al. | 60/276 |
| 5,771,690 | * 6/1998 | Kakizaki et al. | 60/288 |
| 5,782,086 | * 7/1998 | Kato et al. | 60/274 |
| 5,852,929 | * 12/1998 | Kato et al. | 60/274 |

FOREIGN PATENT DOCUMENTS

| | | |
|---|---|---|
| 08071427 | 3/1996 | (JP) . |
| 10159544 | 6/1998 | (JP) . |

* cited by examiner

Primary Examiner—Thomas Denion
Assistant Examiner—Binh Tran
(74) Attorney, Agent, or Firm—Arent Fox Kintner Plotkin & Kahn PLLC.

(57) ABSTRACT

A system for detecting malfunctions of an exhaust switch-over valve of an internal combustion engine, which opens/closes a bypass exhaust gas passage branched from an exhaust pipe of the engine and storing an adsorbent that adsorbs unburned components of the exhaust gas generated by the engine when the engine is started. In the system, the entrance temperature and the exit temperature in the bypass exhaust gas passage are detected and compared with each other in a first detection period when the passage is opened and in a second detection period when the passage is closed. Based on this comparison, it is determined whether the valve malfunctions. Alternatively, the valve malfunction is determined by comparing the valve opening/closing state with an instruction to operate the valve. With this, little time lag exists in the detection, thereby improving malfunction detection accuracy.

26 Claims, 12 Drawing Sheets

HC ADSORBING

ADSORBENT TEMPERATURE RISING

ADSORBENT TEMPERATURE RISING

EXHAUST SWITCH-OVER VALVE MALFUNCTION DETECTION SYSTEM OF INTERNAL COMBUSTION ENGINE

BACKGROUND OF THE INVENTION

1. Field of the Invention

This invention relates to an exhaust switch-over valve malfunction detection system of an internal combustion engine with an exhaust gas purification system that includes an adsorber (stored in a bypass branched from the exhaust pipe that is opened/closed by a swtich-over valve) which adsorbs unburned components such as the hydrocarbon (HC) content of the exhaust gas generated by the engine. This enhances exhaust gas purification, more particularly the invention acts as a system for detecting switch-over valve malfunctions provided at the branching point to selectively open/close the bypass.

2. Description of the Related Art

Internal combustion engines are ordinarily provided with a catalyst (a three-way catalytic converter) in the exhaust system which removes HC, NOx and CO components in the exhaust gas generated by the engine. However, when the engine is cold started, for example, and the catalyst is not activated, unburned components of the exhaust gas, in particular, unburned HC are relesed immediately into the atmosphere.

For that reason, an exhaust gas purification system is proposed, in which the exhaust pipe is branched out at a location downstream of the catalyst and the bypass is provided with an adsorbent made of a zeolite material or some similar materials which adsorbs unburned components such as the HC content when the catalyst is not activated and desorbs the same after the catalyst has been activated to be recirculated into the engine intake system and burned again in the combustion chambers. The bypass is opened/closed by a switch-over valve.

No exhaust gas purification can be achieved in this kind of system if the switch-over valve malfunctions, Japanese Laid-Open Patent Application No. Hei 10 (1998)-159,544 discloses the technique to detect malfunctions of the switch-over valve.

In this prior art, a temperature sensor is installed downstream of the adsorber to detect the temperature Tb at that location if the engine is discriminated to be under steady-state (idling) when the bypass is closed, and then to detect the temperature Ta at the same location if the engine is discriminated to be under steady-state when a time td has passed since the opening of the valve. Then, the difference between Ta and Tb is calculated and it is compared to a predetermined value ΔTlo.

If the result of the Ta and Tb difference is less than or equal to ΔTlo is it determined that the valve leaks.

Moreover, in this prior art, the temperature sensor detects the temperature T3c at the time when a recirculation conduit (which allows the desorbed unburned component to be recirculated upstream) is closed, then another temperature T3d at the same location is detected if the engine is discriminated to be under steady-state (idling) when the recirculation conduit is closed. The difference between T3d and T3c is then calculated and it is determined whether the difference is less than or equal to a predetermined value ΔT3o. When the result is negative, it is also determined that the valve leaks.

In this prior art, thus, the temperatures are detected when the switch-over valve is closed and opened during the engine steady-state. Since, however, the detections are conducted at different times, the engine operation, if it is under steady-state, may be different, in precise speaking, from each other in between these detection times, rendering the malfunction detection accuracy degraded.

SUMMARY OF THE INVENTION

The object of the invention is therefore to provide an exhaust switch-over valve malfunction detection system of an internal combustion engine with an adsorbent installed at a bypass exhaust gas passage branched from the exhaust pipe for adsorbing unburned components of the exhaust gas generated by the engine when a catalyst has not been activated, which has at least one temperature sensor for detecting the bypass temperatures with little time difference in therebetween, thereby solving the drawback of the prior art.

This invention achieves this object by providing a system for detecting malfunctions of an exhaust switch-over valve of an internal combustion engine, for opening/closing a bypass exhaust gas passage, branched from an exhaust pipe of the engine, which stores an adsorbent that adsorbs unburned components of the exhaust gas generated by the engine when the engine has started, comprising: a first temperature sensor, installed at the bypass exhaust gas passage, which detects a first temperature at the bypass exhaust gas passage; detection period setting means for setting a detection period based on a state of opening/closing of the switch-over valve; and valve malfunction determining means for determining whether the switch-over valve malfunctions based on the detected first temperature during the detection period.

BRIEF EXPLANATION OF THE DRAWINGS

The objects and advantages of the invention will become more apparent from the following descriptions and drawings, in which.

PREFERRED EMBODIMENTS OF THE INVENTION

Embodiments of the invention will now be explained with reference to the drawings.

Figure 1:
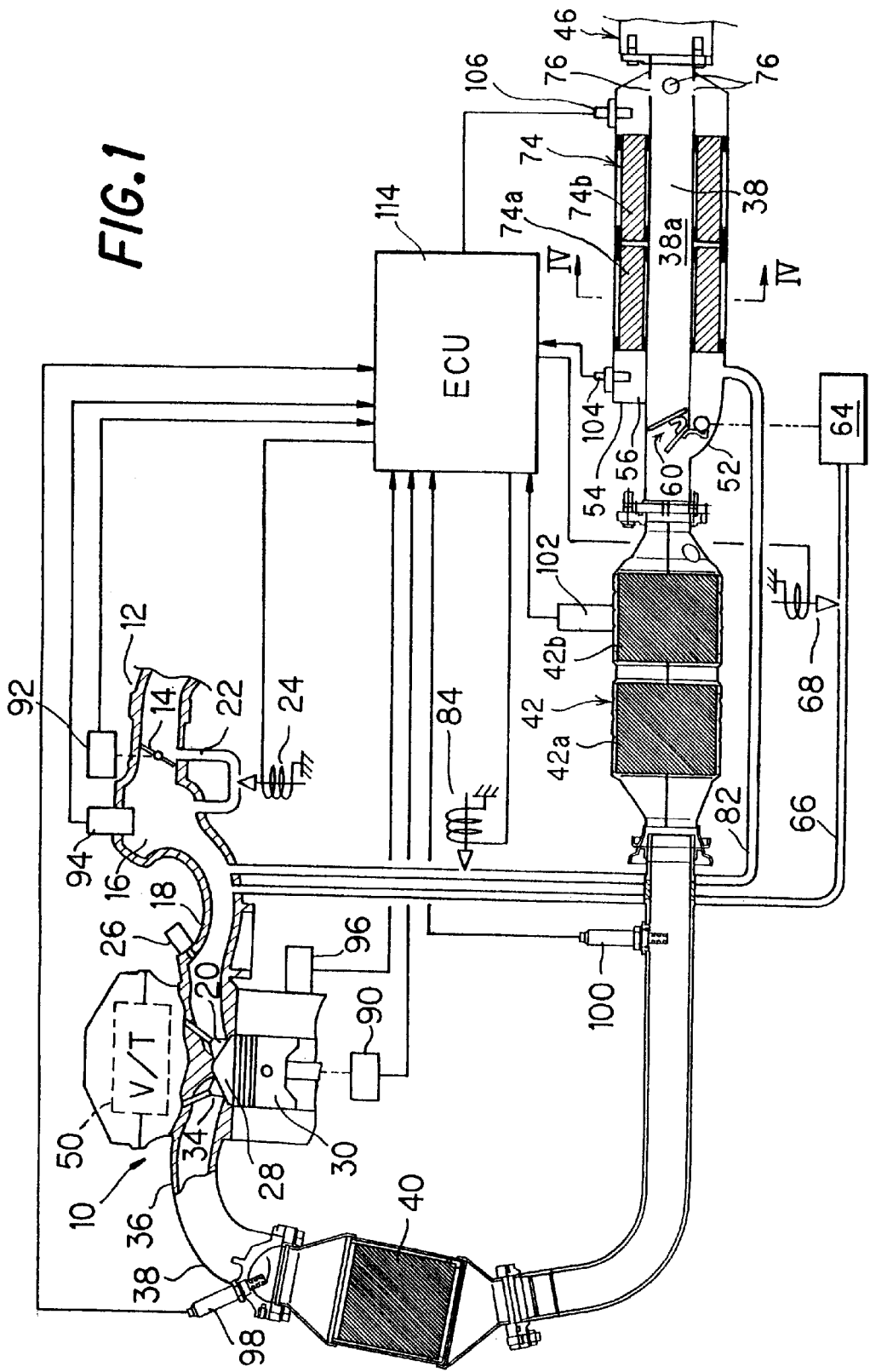
FIG. 1 is a schematic view showing the overall configuration of an exhaust switch-over valve malfunction detection system of an internal combustion engine according to the invention.

FIG. 1 is a view schematically showing the overall configuration of an exhaust switch-over valve malfunction detection system of an internal combustion engine according to the invention.

Reference numeral 10 in this figure designates an overhead cam (OHC) in-line four-cylinder internal combustion engine. Air drawn into an air intake pipe or passage 12 through an air cleaner (not shown) mounted separately is supplied to the first to fourth cylinders (only one is shown) through a surge tank 16, an intake manifold 18 and two intake valves 20 (only one is shown), while the flow thereof is adjusted by a throttle valve 14. The throttle valve 14 is bypassed by a bypass 22 provided at the air intake pipe 12. A valve (EACV) 24 comprised of an electromagnetic solenoid valve is installed in the bypass 22 for closing the same.

A fuel injector 26 is installed in the vicinity of the intake valves 20 of each cylinder for injecting fuel into a combustion chamber 28 of the cylinder concerned. The injected fuel mixes with the intake air to form an air-fuel mixture that is supplied into the cylinder chamber and is ignited there by a spark plug (not shown). The resulting combustion of the air-fuel mixture drives a piston 30 downwards.

The exhaust gas produced by the combustion is discharged through two exhaust valves 34 (only one is shown) into an exhaust manifold 36, from where it passes through an exhaust pipe or passage 38 to a first catalyst (catalytic converter) 40 installed immediately below the exhaust manifold 36 and a second catalyst 42 comprising a first catalyst bed 42a and a second catalyst bed 42b (all three-way catalytic converters) where noxious components are removed therefrom before it is discharged into the atmosphere via a vehicle rear assembly 46 including a muffler and a tail pipe (neither shown).

The engine 10 is equipped with a variable valve timing mechanism 50 (illustrated as "V/T" in FIG. 1). The variable valve timing mechanism 50 switches the opening/closing timing of the intake and/or exhaust valves between two types of timing characteristics, a characteristic for low engine speed and a characteristic for high engine speed, in response to the engine speed NE and the manifold absolute pressure PBA. Since this is a well-known mechanism, it will not be described further here.

The exhaust pipe 38 is connected to a chamber 54, cylindrical in shape, at a location downstream of the second catalyst 42. More specifically, the exhaust pipe 38 is branched off downstream of the second catalyst 42 to form a branch 52. The branch 52 is connected to the chamber 54 which is air-tightly connected to the exhaust pipe 38 to surround the same. With this passages for exhaust gas flow are formed; a main exhaust gas passage 38a passing through the inside of the exhaust pipe 38 and a bypass exhaust gas passage 56 passing through the inside of the branch 52 and the inner space of the chamber 54.

Figure 2:
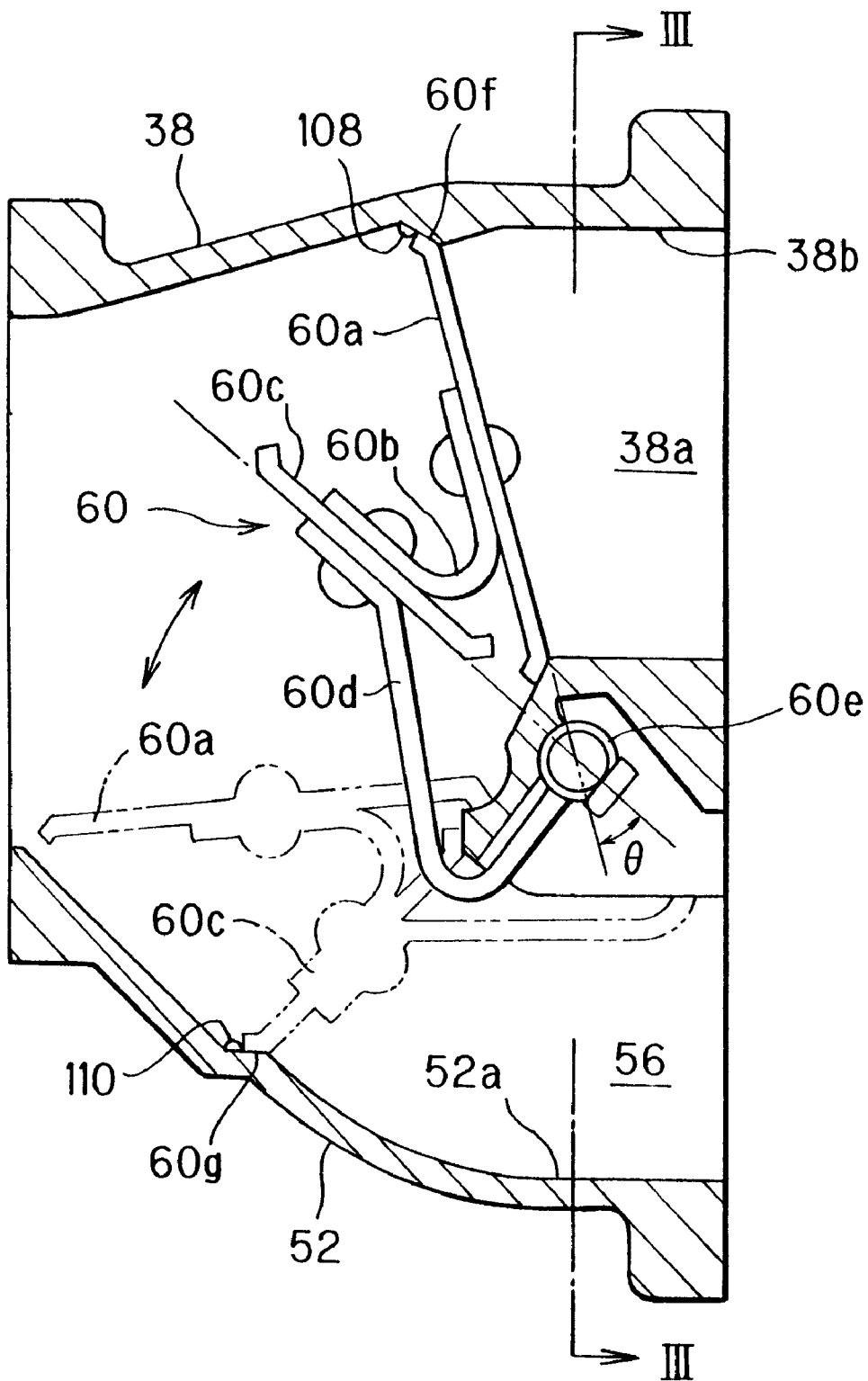
FIG. 2 is an enlarged sectional view of the switch-over valve 60 illustrated in FIG. 1.
Figure 3:
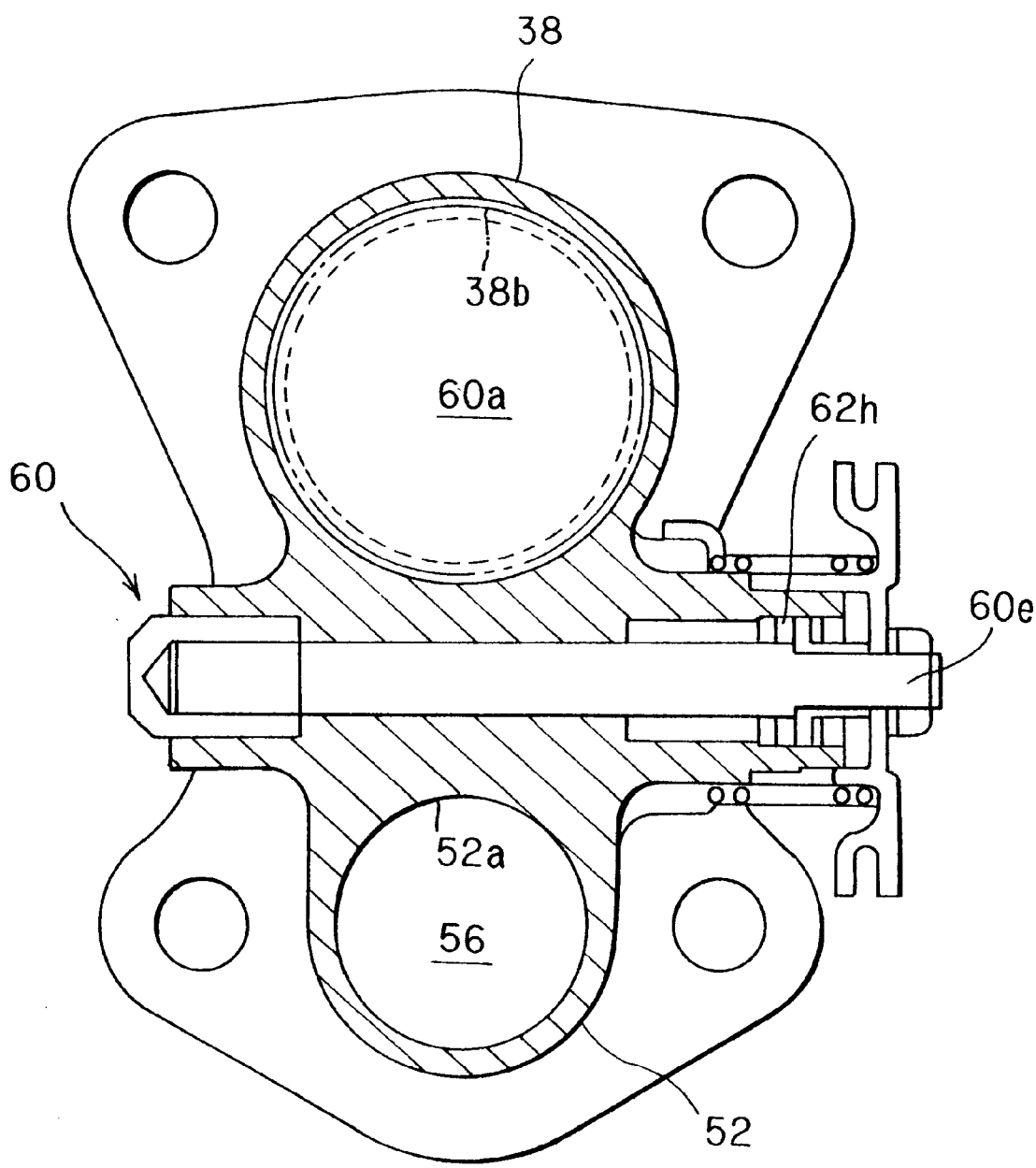
FIG. 3 is a sectional view taken along III—III of FIG. 2.

A switch-over valve (exhaust switch-over valve) 60 is provided in the vicinity of the branching point at the entrance of the chamber 52. FIG. 2 is an enlarged sectional view of the switch-over valve 60 and FIG. 3 is a sectional view taken along III—III of FIG. 2.

The switch-over valve 60 (with reference to FIGS. 2 and 3) comprises a first valve disc 60a which is greater in diameter than the exhaust pipe inner wall 38b defining the main exhaust gas passage 38a, and an arm 60b in an inverted-C shape which connects the first valve disc 60b with a second valve disc 60c which is greater than the diameter of the wall 52a of the branch 52 defining the bypass exhaust gas passage 56. A stem 60d is used to connect the second valve disc 60c to a shaft 60e.

As shown in FIG. 1, the shaft 60e is connected to a valve actuator 64. The valve actuator 64 has a conduit 66 which is connected to the air intake pipe 12 at a location downstream of the throttle valve 14. An electromagnetic solenoid valve (referred later as "TRPV") 68 is installed in the conduit 66, which opens the conduit 66 when energized to introduce the negative pressure therein.

Explaining the operation more specifically with reference to FIG. 2, the valve actuator 64 operates to rotate shaft 60e in the position shown by solid lines in the figure when the negative pressure is introduced such that the first valve disc 60a rests on a valve seat 60f to close the main exhaust gas passage 38a (in other words, it opens the bypass exhaust gas passage 56).

However, when the TRPV 68 is deenergized, the conduit 66 is open to the air. As a result, the shaft 60e is returned to a position shown by phantom lines in the figure by a return spring (not shown) such that the second valve disc 60c rests on a valve seat 60g to close the bypass exhaust gas passage 56 (in other words, it opens the main exhaust gas passage 38a).

It should also be noted that the second valve disc 60c (and the first valve disc 60a) can be at any position between those illustrated in the figure by solid lines and phantom lines, by regulating the amount of negative pressure introduced in the conduit by operating the TRPV 68 in such a way that the bypass exhaust gas passage 56 (and the main exhaust gas passage 38a) is opened by a slight amount.

The first and second valve discs 60a, 60c (FIG. 2) are fixed to the shaft 60e at a predetermined angle θ in such a way, that when the first valve disc 60a closes the main exhaust gas passage 38a, the second valve disc 60c is lifted from the valve seat 60g so as not to block the exhaust gas flowing into the bypass exhaust gas passage 56, while, when the second valve disc 60c closes the bypass exhaust gas passage 56, the first valve 60a is lifted from the valve seat 60f so as not to block the exhaust gas flowing into the main exhaust gas passage 38a.

An adsorbent (HC adsorbing means or HC adsorbing catalyst) 74 (FIG. 1) is installed at the bypass exhaust gas passage 56 in the chamber 54. The adsorbent comprises a first half 74a (provided upstream, i.e., at a position closer to the branch 52) and a second half 74b (provided downstream, i.e., at a position closer to the vehicle rear assembly 46), each carried on a carrier or bed honeycombed in shape made of a spiraled thin metal plate.

Figure 4:
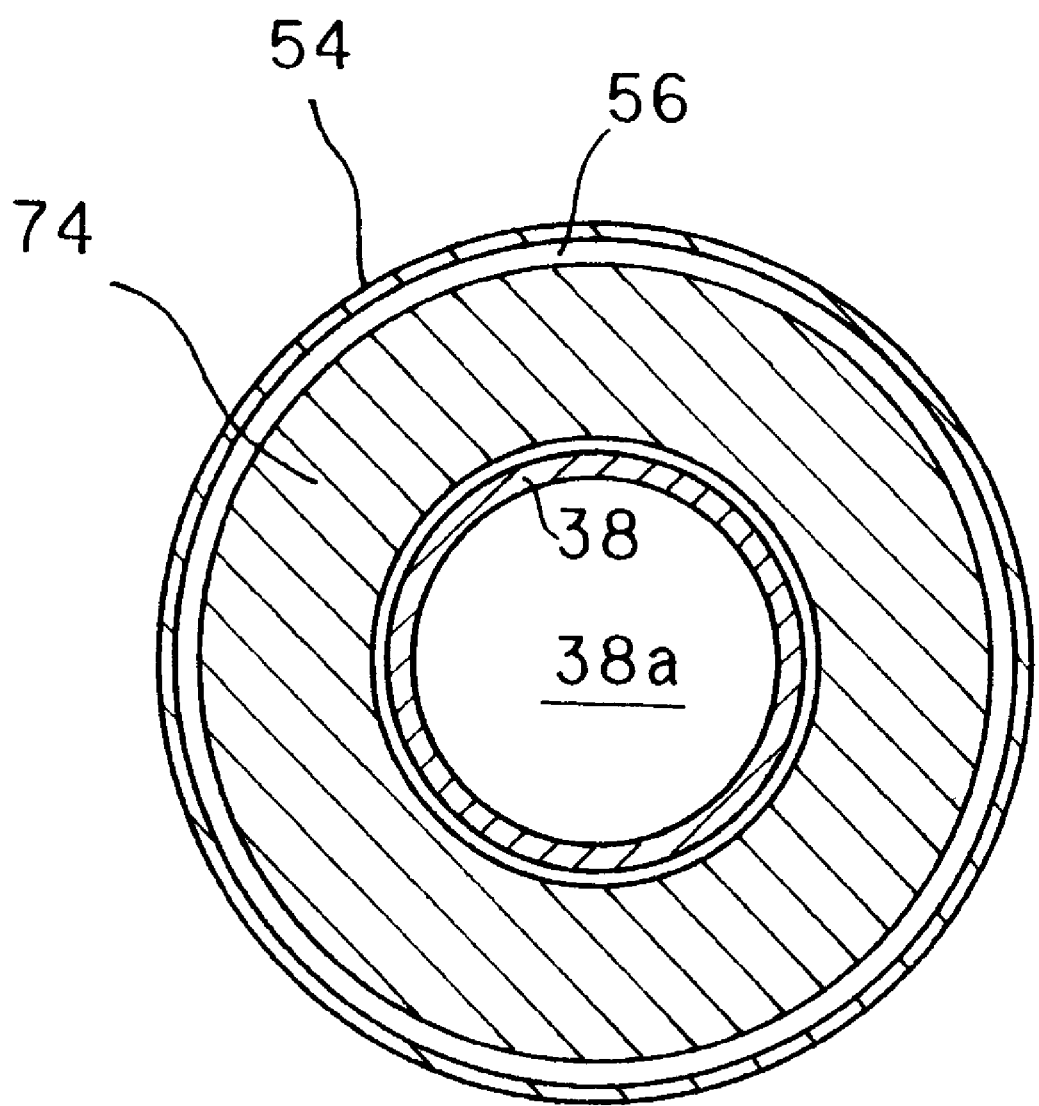
FIG. 4 is a sectional view taken along IV—IV of FIG. 1.

Specifically, as shown in FIG. 4, the chamber 54 is configured to be cylindrical in cross section such that it completely encircles the exhaust pipe 38. More specifically, the adsorbent 74 is positioned close to the exhaust pipe 38 in such a way that the temperature increase of the adsorbent 74 is promoted such that the adsorbed unburned component is desorbed as quickly as possible and is recirculated into the engine intake.

The adsorbent 74 is preferably made from a material comprised of a mixture of crystalline aluminosilicate and a catalyzer element, preferably a mixture of ZSM-5 zeolite and a catalyzer element as proposed by the assignee in Japanese Laid-Open Patent Application No. Hei 8 (1996)-71,427.

The crystalline aluminosilicate is heat-resistant to a temperature of 900° C. to 1000° C. and exhibits an excellent heat-proof property compared to the active carbon used in the prior art. The adsorbent 74 adsorbs the unburned component such as HC in the exhaust gas under low ambient temperatures, i.e., when the exhaust system temperature is at or below 100° C. and desorbs or releases the captured HC at the exhaust system temperature of 100° C. to 250° C.

The exhaust pipe 38 is provided, at its far end, with four holes 76 which are circumferentially located at intervals of 90 degrees. The bypass exhaust gas passage 56 is thus formed from the branch 52 and extends into chamber 54 via the adsorbent 74 up to holes 76 (a confluence point 78) where it merges into the main exhaust gas passage 38*a* in the exhaust pipe 38.

The chamber is connected, at or near the entrance, i.e., at a position upstream of the adsorbent 74 and close to the branch 52, to an EGR conduit 82. The EGR conduit 82 is connected, at the other end, to the air intake pipe 12 at a position downstream of the throttle valve 14. The EGR conduit 82 is provided with an EGR control valve (electromagnetic solenoid valve) 84 which closes the conduit 82 when made ON (energized).

The ignition distributor (not shown) of the engine 10 is provided with a crank angle sensor 90 which generates a signal indicative of Top Dead Center of the piston 30 and a signal indicative of unit angles divided into smaller values. The engine 10 is further provided with a throttle position sensor 92 which generates a signal indicative of the degree of opening θ TH of the throttle valve 14, a manifold absolute pressure (MAP) sensor 94 which generates a signal indicative of the aforesaid manifold absolute pressure PBA of the intake manifold downstream of the throttle valve 14 in terms of absolute value and indicative of the engine load, and a coolant temperature sensor 96 installed in the vicinity of a coolant passage (not shown) of the engine which generates a signal indicative of the temperature TW of the engine coolant.

Further, an universal air/fuel ratio sensor 98 (named LAF sensor) is provided in the exhaust pipe 38 at or downstream of a confluence point of the exhaust manifold 36 and upstream of the first catalyst 40, where it generates a signal indicative of the oxygen concentration in the exhaust gas, as explained later. In addition, an $O_2$ sensor 100 is installed in the exhaust pipe 38 at a location downstream of the first catalyst 40, which generates a signal indicative of the oxygen concentration in the exhaust gas, as explained later.

Furthermore, a temperature sensor 102 is installed in the vicinity of the second catalyst bed 42*b* of the second catalyst 42 and generates a signal indicative of the temperature of the second catalyst bed 42*b*, more generally the exhaust gas temperature TCAT in the exhaust system. A temperature sensor 104 is installed at the bypass exhaust gas passage 56 in the chamber 54, more precisely at a location upstream of the first adsorbent half 74*a* (at a position close to the branch 52), and generates a signal indicative of the temperature at the entrance (tmp.in) of the bypass exhaust gas passage 56. Another temperature sensor 106 is installed at the bypass exhaust gas passage 56 in the chamber 54 at a location downstream of the second adsorbent half 74*b* (at a position close to the vehicle rear assembly 46), and generates a signal indicative of the temperature at the exit (tmp.out) of the bypass exhaust gas passage 56, in other words, the temperature at the confluence point of the bypass exhaust gas passage 56 and the main exhaust gas passage 38*a*.

Furthermore, as shown in FIG. 2, two limit switches 108, 110 are provided in the vicinity of the valve seats 60*f*, 60*g* of the switch-over valve 60 respectively and generate an ON signal when the valve disc 60*a* (closing the main exhaust gas passage 38*a*) or the valve disc 60*c* (closing the bypass exhaust gas passage 56) is driven to rest on the valve seat 60*f* or the valve seat 60*g* (or to a position close thereto).

Furthermore, a valve timing sensor (not shown) is provided in a hydraulic pressure circuit (not shown) of the variable valve timing mechanism 50 and generates a signal indicating which characteristic is selected, and a lift sensor (not shown) is provided in the vicinity of the EGR conduit 84 and generates a signal indicative of the amount of lifting or stroke of the EGR control valve 84.

These output signals generated by the sensors are forwarded to an Electronic Control Unit (ECU) 114 comprising a microcomputer.

Figure 5:
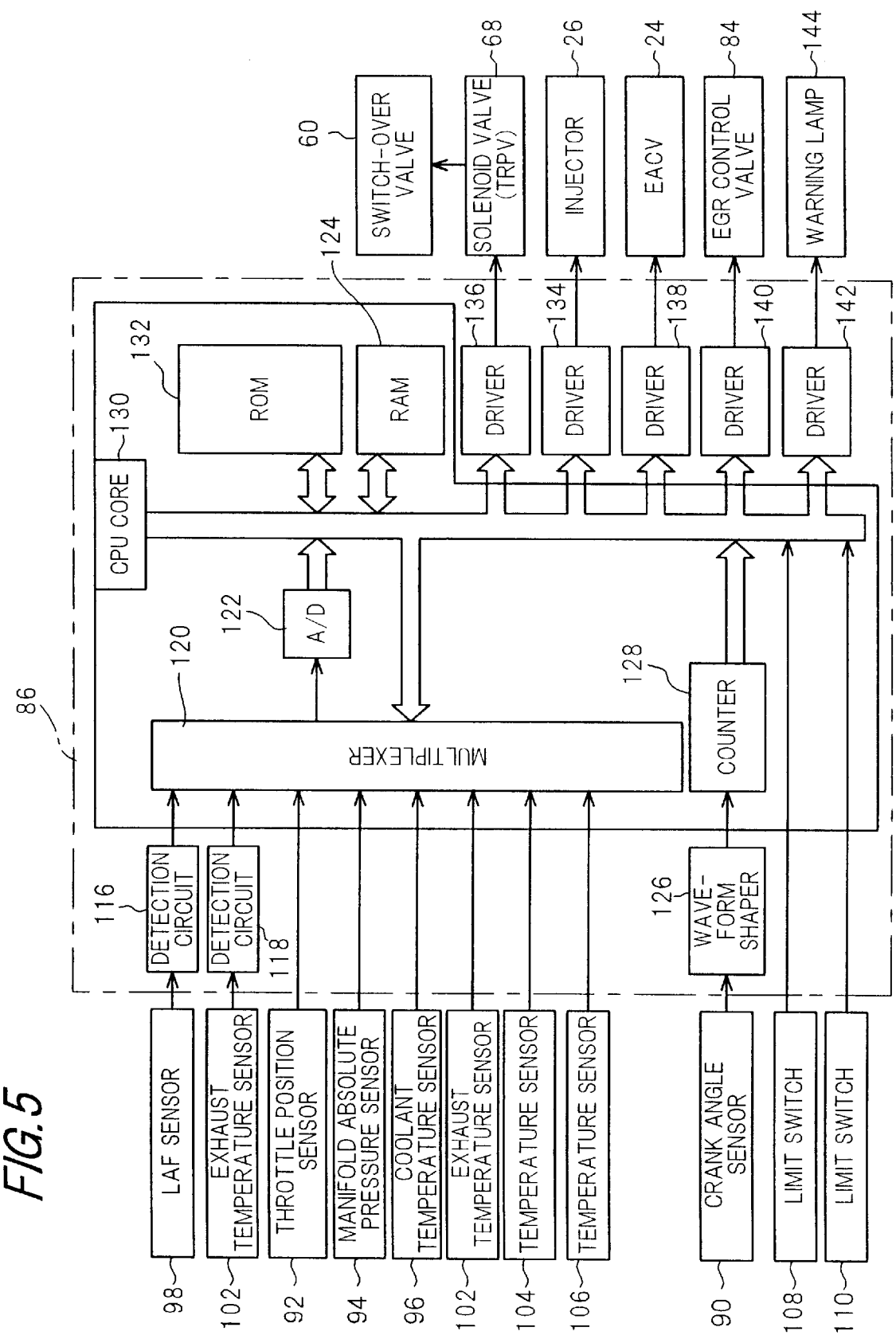
FIG. 5 is a block diagram showing the details of the Electronic Control Unit (ECU) illustrated in FIG. 1.

Details of the ECU 114 are shown in the block diagram of FIG. 5.

The output of the LAF sensor 98 is received by a first detection circuit 116, where it is subjected to appropriate linearization processing for producing an output characterized in that it varies linearly with the oxygen concentration of the exhaust gas over a broad range extending from lean to rich. The output of the $O_2$ sensor 100 is input to a second detection circuit 118 which generates a switching signal indicating that the air/fuel ratio in the exhaust gas emitted from the engine 10 is rich or lean with respect the stoichiometric air/fuel ratio.

The output of the first detection circuit 116 is forwarded through a multiplexer 120 and an A/D converter 122 to a RAM (random access memory) 124 in a CPU (central processing unit). Specifically, the CPU has a CPU core 130, a ROM (read-only memory) 132 and the RAM 124, and the output of the first detection circuit 116 is A/D-converted and stored in buffers of the RAM 124. Similarly, the output of the second detection circuit 118 and the analogue outputs of the throttle position sensor 92, etc., are inputted into the CPU through the multiplexer 120 and the A/D converter 122 and stored in the RAM 124.

The output of the crank angle sensor 90 is shaped by a wave-form shaper 126 and has its output value counted by a counter 128. The count is inputted into the CPU and the engine speed NE is detected or calculated from the count. In accordance with commands stored in the ROM 132, the CPU core 130 computes a manipulated variable and drives the fuel injectors 26 of the respective cylinders via a driver 134.

The CPU core 130 also drives, via a driver 136, through the electromagnetic valve (TRPV) 68 and the valve actuator 64 (not shown in FIG. 5) to operate the switch-over valve 60, and the CPU core 130 further detects malfunctions of the switch-over valve 60.

It should be noted here that the malfunctions of the switch-over valve 60 include malfunctions in rotation of the shaft 60*e* due to the carbon in the exhaust gas entering in a bearing 60*h* (shown in FIG. 3), malfunctions in sealing of the valve discs 60*a* or 60*c* due to the carbon in the exhaust gas depositing on the valve seats 60*f* or 60*g*, breakage of the valve discs 60*a*, 60*c* or the shaft 60*e*. More generally, the malfunctions of the switch-over valve 60 indicate troubles or failures which make the switch-over valve 60, specifically valve disc 60*a* or 60, impossible to close or open passages 38*a* or 56.

Furthermore, the CPU core 130 drives the EACV 24 and the EGR control valve 84 through drivers 138, 140. Moreover, the CPU core 130 lights a warning lamp (not shown in FIG. 1) 144 through a driver 142.

The mode of operation of the exhaust switch-over valve malfunction detection system of an internal combustion engine according to the invention will be explained.

Figure 6:
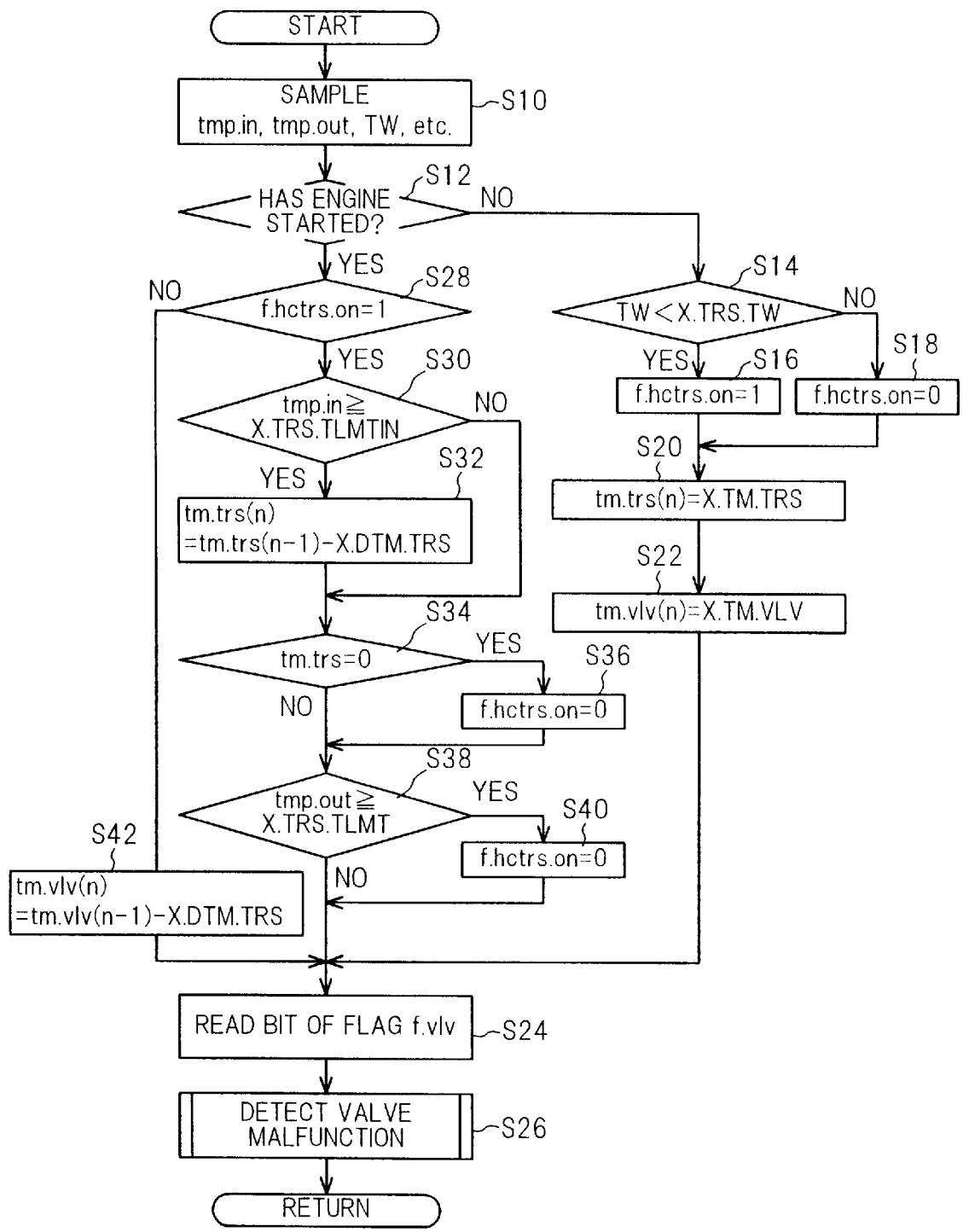
FIG. 6 is a flow chart showing the operation of the exhaust switch-over valve malfunction detection of the system illustrated in FIG. 1, including the operation of an exhaust gas purification system illustrated in FIG. 1.

FIG. 6 is a flow chart showing the operation of the system, more precisely, the detection of malfunctions occurring at the switch-over valve 60 based on the operation of the exhaust gas purification system using the adsorbent 74.

Since the exhaust switch-over valve malfunction detection is based on the operation of the exhaust gas purification system using the adsorbent 74, before entering into the explanation of the figure, the operation will be described with reference to FIG. 7.

Figure 7A:
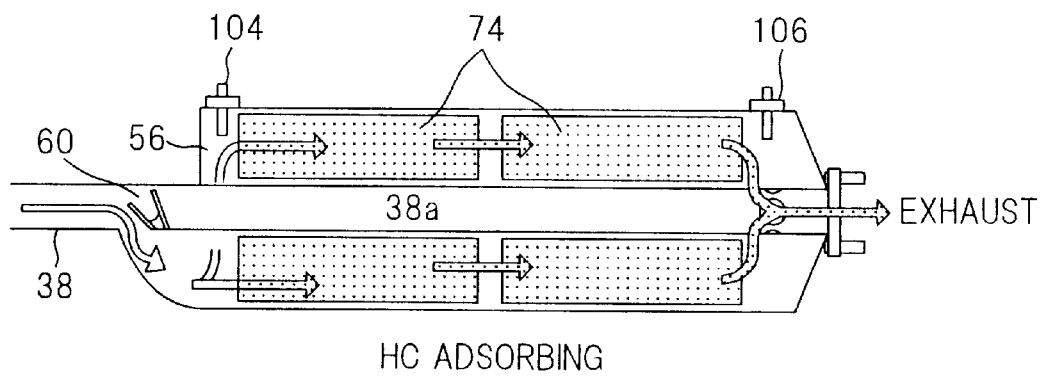
FIGS. 7A, 7B and 7C are explanatory views showing the operation of the exhaust gas purification system illustrated in FIG. 6.

In the exhaust gas purification system illustrated in the figure, when the engine 10 is cold-started, the switch-over valve 60 is kept in the position shown by the solid lines in FIG. 2 for a predetermined period of time (e.g., 40 sec.) since when the engine starts the main exhaust gas passage 38a is closed, while the bypass exhaust gas passage 56 is opened, as illustrated in FIG. 7A.

Since the first and second catalysts 40, 42 provided upstream of the adsorbent 74 have not been activated during the aforesaid period of time when the engine 10 was cold-started, the exhaust gas is not purified by the catalysts 40, 42. The exhaust gas flows through the bypass exhaust gas passage 56, as shown by arrows in FIG. 7A, and the unburned HC component is adsorbed by the adsorbent 74.

Figure 7B:
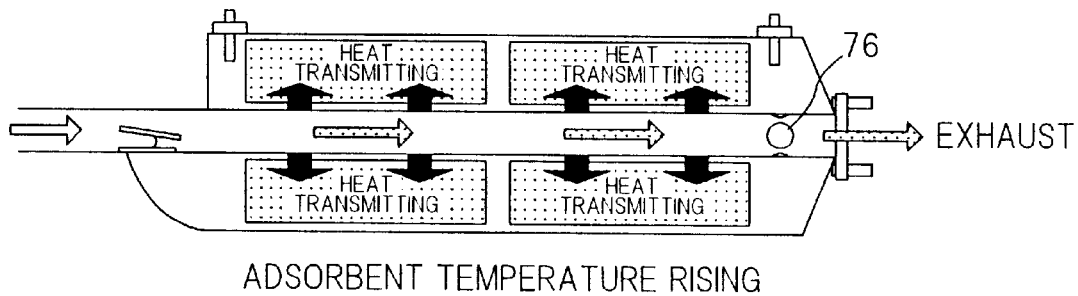

As the upstream catalysts 40, 42 are normally activated after a lapse of a predetermined period of time, the switch-over valve 60 is driven to the position shown by phantom lines in FIG. 2 such that the main exhaust gas passage 38a is opened, while the bypass exhaust gas passage 56 is closed, as illustrated in FIG. 7B.

Accordingly, the exhaust gas purified by the upstream catalysts 40, 42 flows through the main exhaust gas passage 38a and heats the adsorbent 74. As a result, the unburned HC component adsorbed by the adsorbent 74 begins to desorb. Since the pressure of the exhaust gas flowing through the main exhaust gas passage 38a is greater than that flowing through the bypass exhaust gas passage 56, a part or portion of the exhaust gas enters the bypass exhaust gas passage 56 through the holes 76.

Figure 7C:
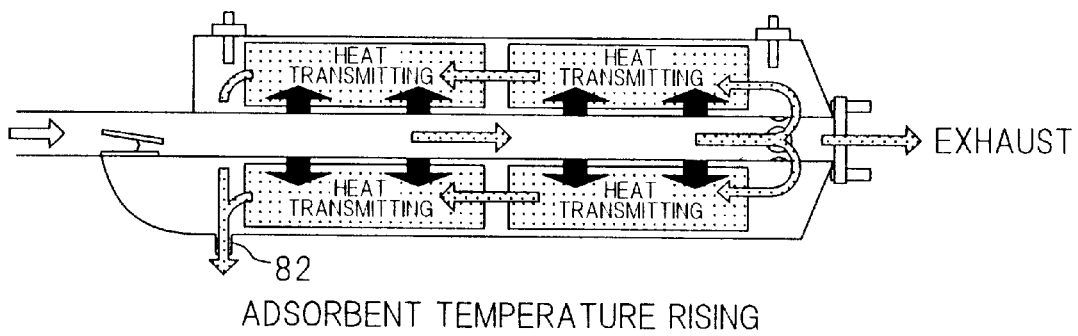

As illustrated in FIG. 7C, the desorbed unburned HC component is recirculated back to the engine intake system through the EGR conduit 82, when the EGR is conducted. At this time, a part or portion of the exhaust gas flowing through the main exhaust gas passage 38a is sucked in by the negative pressure generated at the engine intake system and enters the bypass exhaust gas passage 56 through the holes 76.

The introduced exhaust gas flows through the bypass exhaust gas passage 56 in a direction opposite to that of the exhaust gas flowing through the main exhaust gas passage, while accelerating or expediting the heating of the adsorbent 74, and is recirculated into the engine intake system to be burned once again. The exhaust gas generated by this re-burning is purified by the upstream catalysts 40, 42 and is emitted outside of the engine 10 through the main exhaust gas passage 38a.

Figure 8:
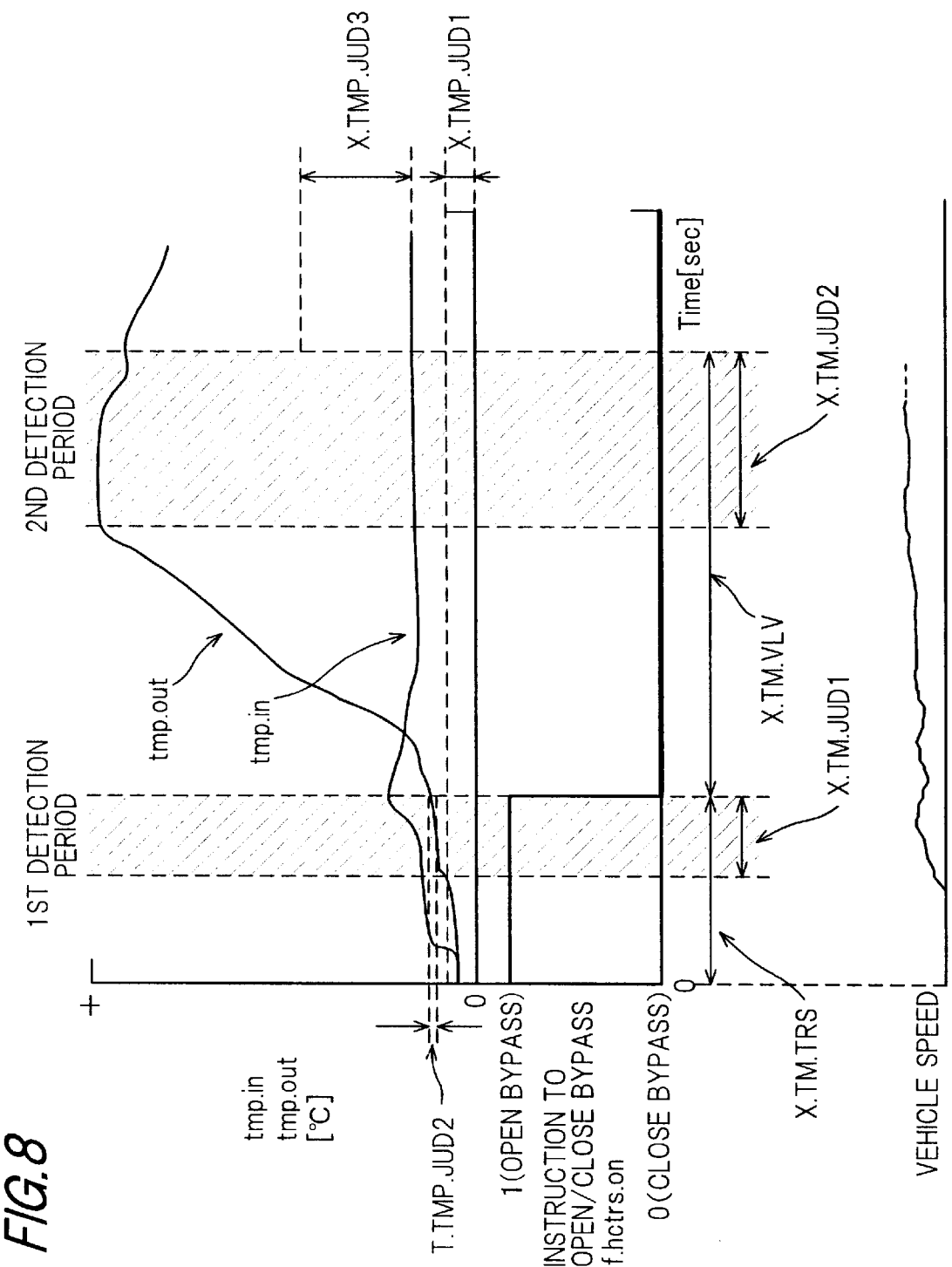
FIG. 8 is a time chart explaining the operation of the exhaust switch-over valve malfunction detection using the exhaust gas purification system illustrated in FIG. 7.

Under the conditions shown in FIGS. 7A and 7B, if the switch-over valve 60 is normal, the aforesaid entrance temperature tmp.in and the exit temperature tmp.out in the bypass exhaust gas passage 56 will be as shown in FIG. 8. FIG. 8 is a time chart showing the exhaust gas purification immediately after the vehicle (on which the engine 10 is mounted) is started.

As shown in the figure, when the switch-over valve 60 is operated in response to an instruction to valve operation (shown as a flag f.hctrs.on) in such a manner that the valve disc 60c is lifted from the valve seat 60g and the valve disc 60a is rested on the valve seat 60f such that the bypass exhaust gas passage 56 is opened, while the main exhaust gas passage 38a is closed, the entrance temperature tmp.in in the bypass exhaust gas passage 56 rises gradually with increasing exhaust gas flow. Similarly, the exit temperature tmp.out in the bypass exhaust gas passage 56 rises. However, since the entering exhaust gas exchanges heat with the adsorbent 74, the rise of the exit temperature tmp.out lags behind the rise of the entrance temperature tmp.in.

Then, when the switch-over valve 60 is operated in response to the instruction to open the main exhaust gas passage 38a and closes bypass exhaust gas passage 56, since the exhaust gas flows through the main exhaust gas passage 38a, the entrance temperature tmp.in in the bypass exhaust gas passage 56 rises little. However, since a part or portion of the exhaust gas enters the bypass exhaust gas passage 56 from the exit side through the holes 76, the exit temperature tmp.out in the bypass exhaust gas passage 56 rises greatly beyond the entrance temperature tmp.in, as illustrated in FIG. 8.

The above indicates that, if a first detection period and a second detection period are set, as illustrated in FIG. 8, and if the temperatures at those periods are compared to each other, the malfunctions of the switch-over valve 60 can be detected. This invention was made based on this founding. The first and second detection periods should preferably be set to periods during which the detected temperatures are stable.

Based on the above, the operation of the system will be explained with reference to the flow chart in FIG. 6. The ECU 114 starts operating when the ignition switch is made on and executes the program once every 50 msec.

The program begins at S10, where the entrance temperature tmp.in, the exit temperature tmp.out, and the engine coolant temperature TW, etc., are sampled (read) and proceeds to S12, where it is determined whether the engine 10 has started. This is done by determining whether the engine 10 has started cranking and the fuel injection has been started. If the cranking has started, but the fuel injection has not, it is determined that the engine 10 has not started.

The result in S12 is normally negative in the first program loop and the program proceeds to S14 in which it is determined whether the sampled (detected) engine coolant temperature TW is less than a predetermined value X.TRS.TW, therefore, it is determined whether the engine 10 has been warmed up. It should be noted, that a value or parameter having the prefix "X" in this specification and corresponding figures indicates a predetermined value or parameter.

When the result in S14 is affirmative, the program proceeds to S16 in which the bit of the flag h.hctrs.on is set to 1. When the result in S14 is negative, the program proceeds to S18 in which the bit of the flag is reset to 0. As will be understood from FIG. 8, to set the bit of the flag to 1 indicates to issue the instruction to operate the switch-over valve 60 such that the bypass exhaust gas passage 56 is opened, while to reset it to 0 indicates to generate the instruction to operate the valve 60 such that the bypass exhaust gas passage 56 is closed. In S16, the instruction is generated to operate the switch-over valve 60 to open the bypass exhaust gas passage 56 to begin the HC adsorption. The operation of the switch-over valve 60 itself is conducted in a routine (not shown) by operating the valve actuator 64.

The program proceeds to S20 in which a timer for valve control (down counter) tm.trs(n) is set with a predetermined value X.TM.TRS. As shown in FIG. 8, this value corresponds to a period of time (e.g., 40 sec.) during which the bypass exhaust gas passage 56 should be kept open.

In this specification and corresponding figures, the suffix "n" represents a sampling number in the discrete-time system, specifically, the time at which the program of FIG. 6 flow chart is executed, more specifically, (n) indicates the current program-execution-time and (n−1) indicates the preceding program-execution-time. For brevity, addition of (n) to values at the current time is often omitted.

The program proceeds to S22 in which a timer for valve malfunction detection (down counter) tm.vlv(n) is set with a predetermined value X.TM.VLV to start time measurement. As shown in FIG. 8, this value corresponds to a period of time from the issuance of instruction to close the bypass exhaust gas passage 56 to the end of the second detection period.

The program then proceeds to S24 in which the bit of the flag f.vlv is read. Specifically, the operating state of the switch-over valve 60 is discriminated based on the outputs of the limit switches 108, 110 in a routine (not shown) and in response to the discrimination, the bit of the flag f.vlv is set to 1 or reset to 0. The bit of the (thus set or reset) flag is read in S24. The fact that the bit of the flag f.vlv is set to 1 indicates that the bypass exhaust gas passage 56 is open, while the fact that the bit is reset to 0 indicates that the passage 56 is closed.

The program proceeds to S26 in which it is determined whether the switch-over valve 60 malfunctions. This will be explained later.

When the result in S12 is affirmative in the next or later program loop, as this means that the engine 10 has started, the program proceeds to S28 in which it is determined whether the flag f.hctrs.on is set to 1, therefore, it is determined whether the engine 10 is cold-started and hence, the HC adsorption is in progress.

When the result in S28 is affirmative, since this means that the bypass exhaust gas passage 56 is opened and the HC adsorption is in progress, the program proceeds to S30 in which it is determined whether the detected entrance temperature tmp.in is greater or equal to a predetermined value X.TRS.TLMTIN. As the completion of combustion is not discriminated in determining whether the engine 10 has started in the procedures shown in FIG. 6, the procedure in this step accounts for the discrimination of combustion completion.

When the result in S30 is affirmative, since this indicates that the combustion of the engine 10 has been completed, the program proceeds to S32 in which the predetermined value X.DTM.TRS is subtracted from the last value tm.trs(n−1) of the timer tm.trs(n) to determine the current timer value tm.trs(n), in other words, the time lapse from the issuance of instruction to open the bypass exhaust gas passage 56. However, when the result in S30 is negative, as this indicates that the combustion of the engine 10 has not been completed, the program skips S32.

The program proceeds to S34 in which it is determined whether the value of the timer tm.trs has reached zero, and if the result is affirmative, the program proceeds to S36 in which the bit of the flag f.hctrs.on (instructions to valve operation) is reset to 0. With this, the switch-over valve 60 is operated in another routine to close the bypass exhaust gas passage 56.

The program proceeds to S38 in which it is determined whether the exit temperature tmp.out in the bypass exhaust gas passage 56 is greater or equal to a predetermined value X.TRS.TLMT. When the result is affirmative, the program proceeds to S40 in which the bit of the flag f.hctrs.on is reset to 0. Although the opening of the bypass exhaust gas passage 56 is limited to the predetermined period of time X.TM.TRS (e.g., 40 sec.), if the temperature of the adsorbent 74 rises at a speed higher than expected, the bypass exhaust gas passage 56 is immediately closed so as to stop the temperature rising in the adsorbent 74 such that the solvent 74 does not desorb the adsorbed HC component any more. The procedure in this step is an emergency measure.

When the result in S28 is negative, the program proceeds to S42 in which the timer tm.vlv is decremented by a predetermined value X.DTM.TRS in a manner similar to that shown in S32. Specifically, since the instruction is issued to close the bypass exhaust gas passage 56, the time lapse to the second detection period is measured.

The malfunction detection of the switch-over valve 60 referred to in S26 will next be explained.

Figure 9:
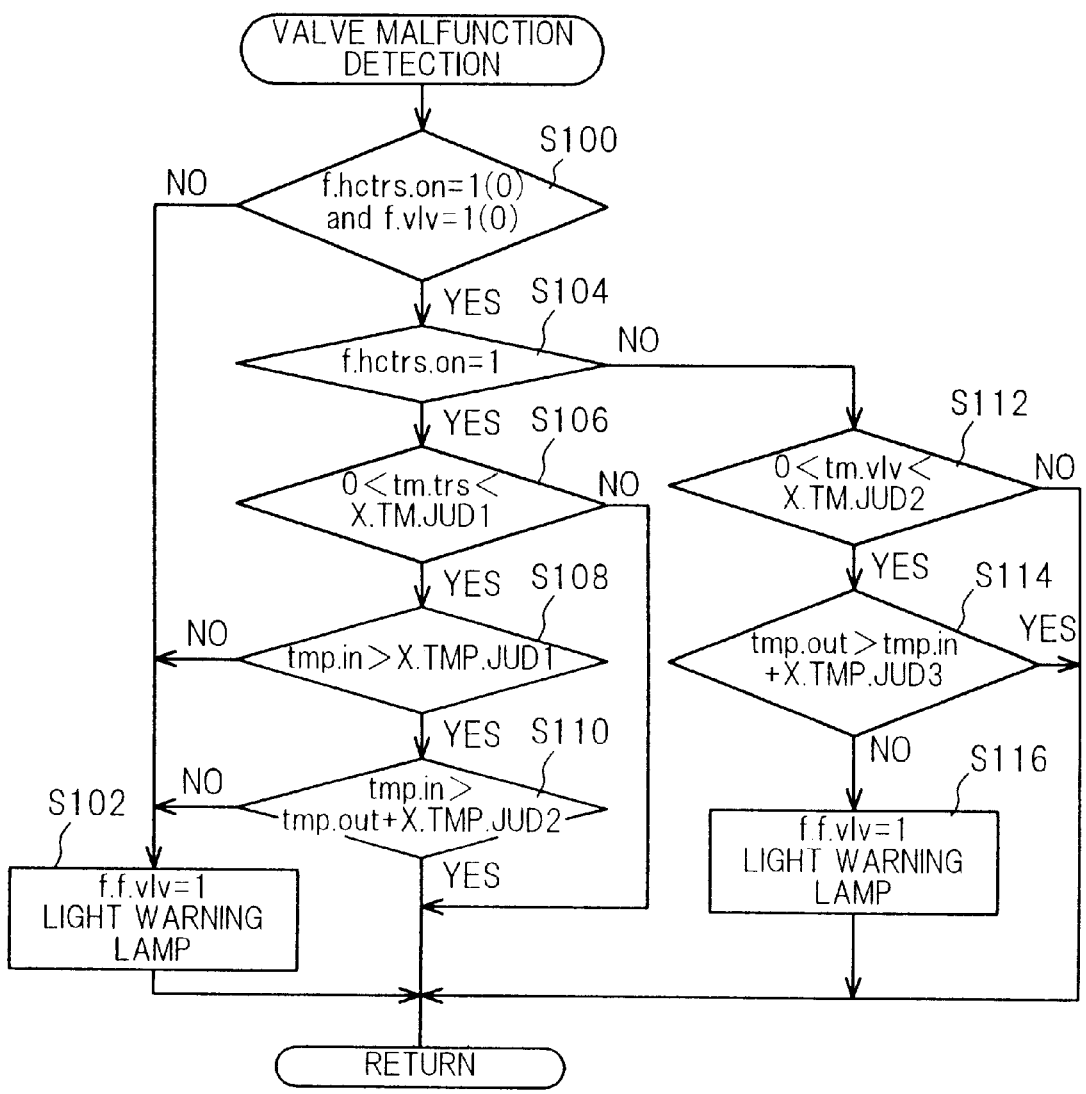
FIG. 9 is a flow chart showing the subroutine of FIG. 6 for the exhaust switch-over valve malfunction detection.

FIG. 9 is a flow chart showing the subroutine for the malfunction detection.

The program begins at S100 where it is determined whether the bits of the flags f.hctrs.on and f.vlv are both set to 1 (or are both reset to 0), therefore it is determined whether the bits are the same. Specifically, it is determined whether the instruction of valve operation is equal to the valve operation state, more specifically, it is determined whether the switch-over valve 60 operates as instructed.

When the result in S100 is negative, it can immediately be determined that the switch-over valve 60 malfunctions, without conducting a determination using an algorithm, the program proceeds to S102 in which the bit of a flag f.f.vlv is set to 1 and alerts the vehicle operator by lighting the warning lamp 144 through the driver 142 so as to call upon him to repair the valve 60. Thus, to set the bit of the flag f.f.vlv to 1 indicates that the switch-over valve 60 is faulty, while to reset the bit to 0 indicates that the valve 60 is normal.

When the result in S100 is affirmative, the program proceeds to S104 in which it is determined whether the bit of the aforesaid flag f.hctrs.on is set to 1, in other words, it is determined whether the instruction is issued to open bypass exhaust gas passage 56. This determination may alternatively be made by referring to the bit of the flag f.vlv.

When the result is affirmative, the program proceeds to S106 in which it is determined whether the value of the timer tm.trs is in between zero and a predetermined value X.TM.JUD1. The predetermined value X.TM.JUD1 indicates the first detection period as is understood from FIG. 8. The determination in this step amounts for determining whether it is during the first detection period.

When the result in S106 is affirmative, the program proceeds to S108 in which the detected entrance temperature tmp.in is greater than a predetermined value (threshold value) X.TMP.JUD1. As mentioned above with reference to FIG. 8, when the bypass exhaust gas passage 56 is opened, the entrance temperature tmp.in must rise gradually with respect to time.

Accordingly, as shown in FIG. 8, by setting the predetermined value X.TMP.JUD1 (threshold value), it is determined whether the detected entrance temperature tmp.in is greater than the predetermined value in the detection period after a prescribed time has passed since the bypass exhaust gas passage 56 was opened.

Figure 10:
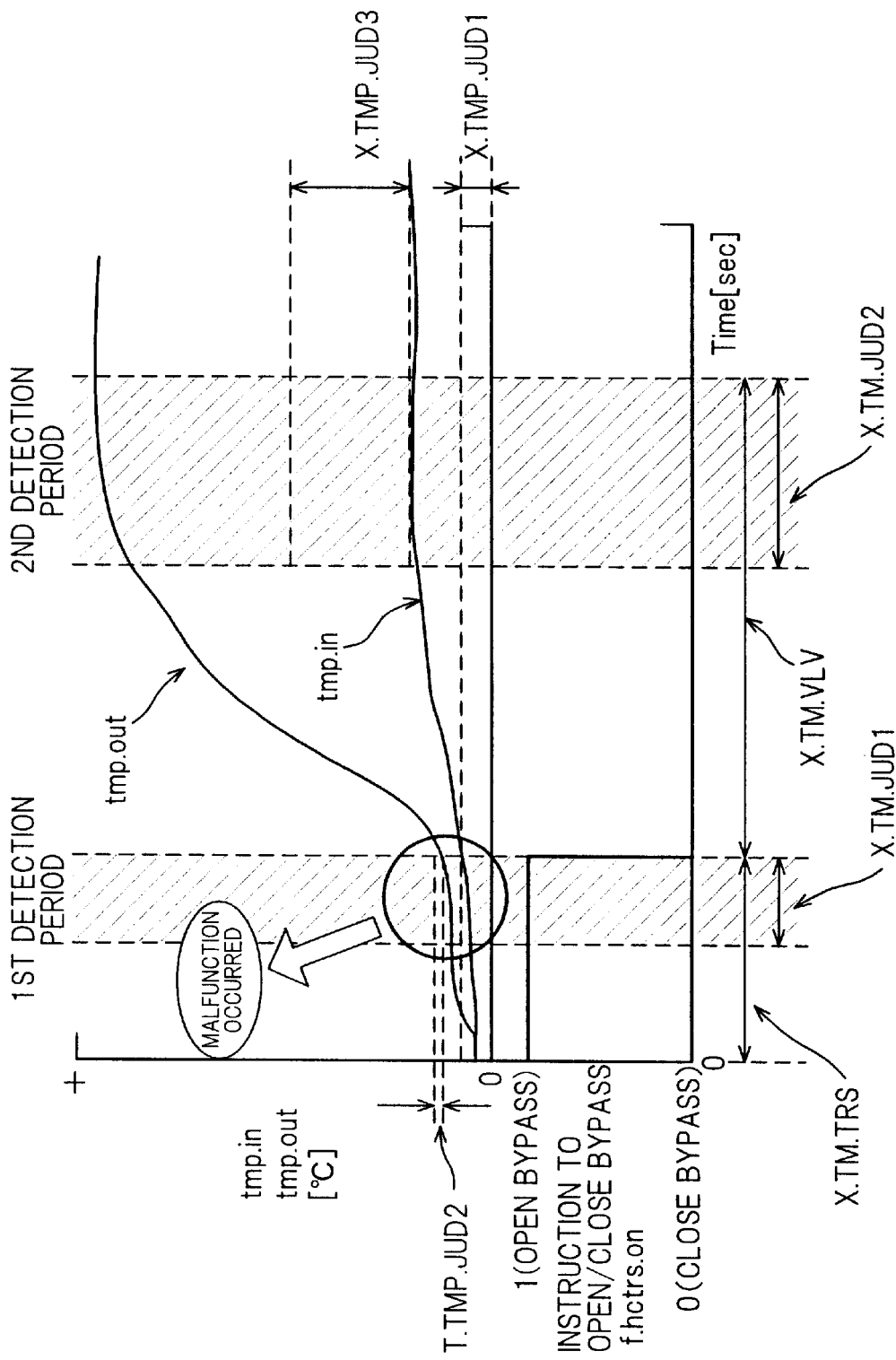
FIG. 10 is a view, similar to FIG. 8, but explaining the case in which a malfunction makes it impossible to open the valve.

When the result in S108 is negative, since this indicates that the detected entrance temperature tmp.in is not greater than the predetermined value X. TMP.JUD1 (threshold value) as illustrated in FIG. 10. Particularly, since it can be judged from this that the switch-over valve 60 malfunctions, more particularly, the valve disc 60c does not lift from the valve seat 60g and sticks there to make it impossible to be opened, the program proceeds to S102 in which the procedures mentioned above are conducted.

However, when the result in S108 is affirmative, the program proceeds to S110 in which a predetermined value X.TMP.JUD2 is added to the detected exit temperature tmp.out and it is determined whether the detected entrance temperature tmp.in is greater than the sum.

Figure 11:
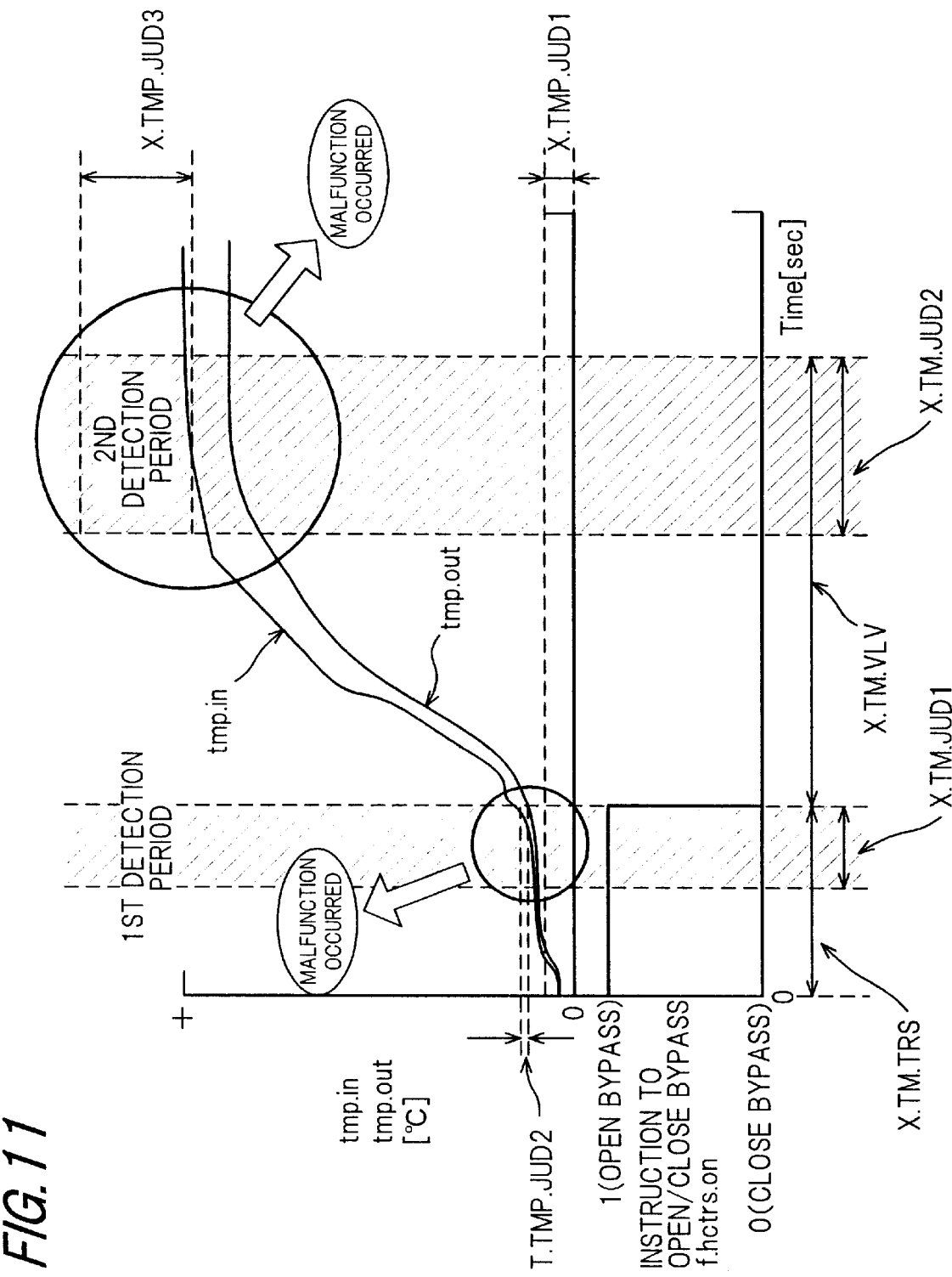
FIG. 11 is a view, similar to FIG. 8, but explaining the case in which a malfunction makes it impossible to close the valve.

As shown in FIG. 8, if the bypass exhaust gas passage 56 is open, the entrance temperature must be greater than the exit temperature. Accordingly, if the situation is as shown in FIG. 11 and the result in this step is negative, it can be considered that a malfunction, such as valve discs 60a or 60c breaking, or the sealing brakes not working, so that both the main exhaust gas passage 38a and the bypass exhaust gas passage 56 can not be closed, would happen. Therefore, the program proceeds to S102. The reason why the predetermined value X.TMP.JUD2 is added, is to conduct the malfunction detection, thereby preventing an erroneous detection from happening.

When the result in S106 is negative, as this indicates it is not within the first detection period, the program skips S108 and S110.

On the other hand, when the result in S104 is negative, since this indicates that the instruction is issued to close the bypass exhaust gas passage 56, the program proceeds to S112 in which the value of timer tm.vlv is in between zero and a predetermined value X.TM.JUD2. The predetermined value X.TM.JUD2 corresponds to the second detection period as shown in FIG. 8, and the procedure in S112 corresponds to determining whether it is within the second detection period.

When the result is affirmative, the program proceeds to S114 in which a predetermined value X.TMP.JUD3 is added to the detected entrance temperature tmp.in and it is determined whether the detected exit temperature tmp.out is greater than the sum.

Figure 12:
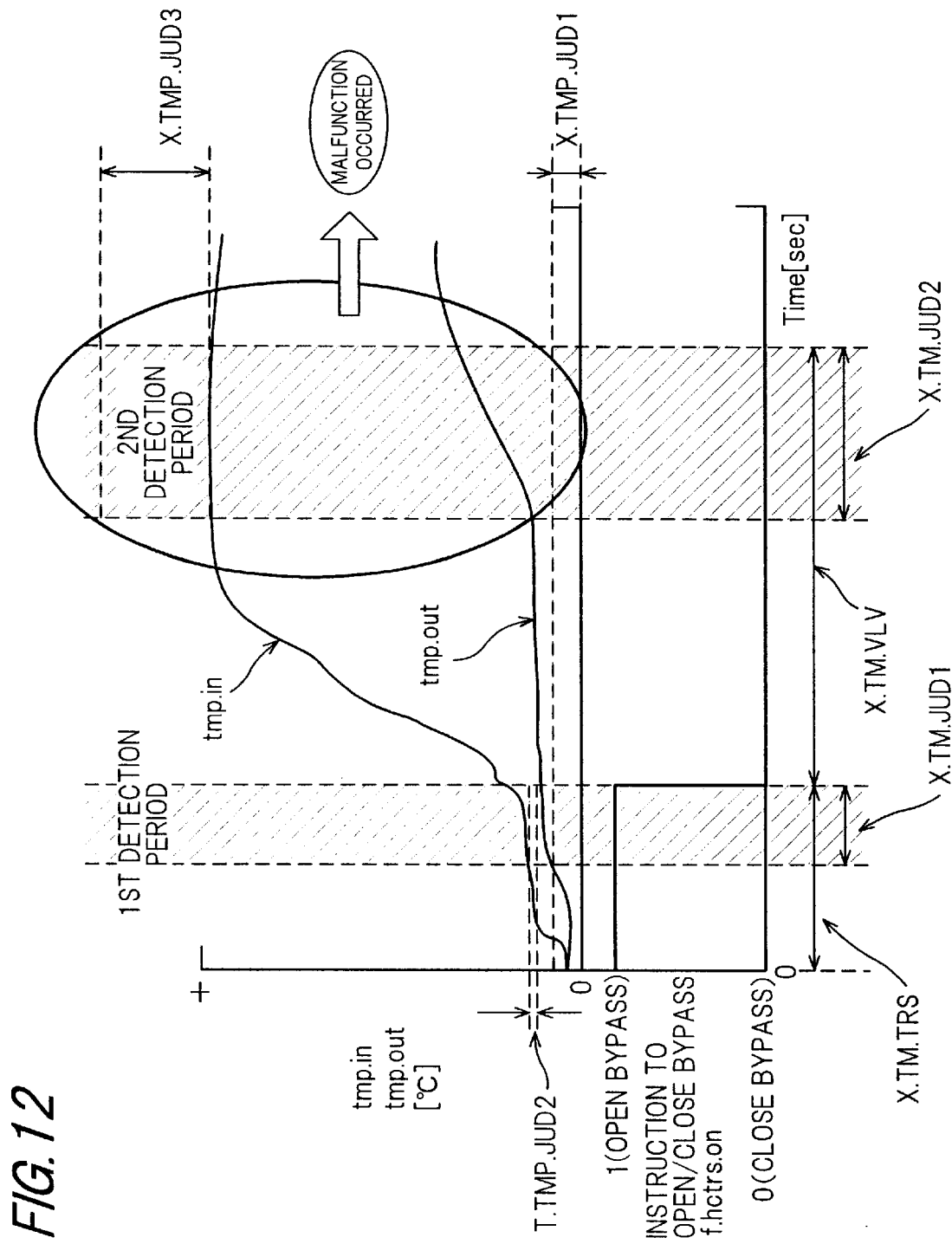
FIG. 12 is a view, similar to FIG. 11, but explaining the case in which a different malfunction also makes it impossible to close the valve.

As shown in FIG. 8, if the bypass exhaust gas passage 56 is closed, the exit temperature must be greater than the entrance temperature. Accordingly, if the situation is as shown in FIGS. 11 or 12 and the result in this step is negative, it can be considered that a malfunction such as the valve disc 60c resting with a gap therebetween such that the bypass exhaust gas passage 56 can not be closed, would happen. Therefore, the program proceeds to S102. The reason why the predetermined value X.TMP.JUD3 is added, is to activate the malfunction detection, thereby preventing an erroneous detection from happening.

When the result in S112 is negative, since this indicates that it is not within the first detection period, the program skips S114 and S116. When the result in S114 is affirmative, the program skips S116.

The embodiment is thus configured to have a system for detecting malfunctions of an exhaust switch-over valve 60 of an internal combustion engine 10, for opening/closing a bypass exhaust gas passage 56, branched from an exhaust pipe 38 of the engine, which stores an adsorbent 54 that adsorbs unburned components of the exhaust gas generated by the engine when the engine is started, comprising: a first temperature sensor 104, installed at the bypass exhaust gas passage, which detects a first temperature (entrance temperature tmp.in) at the bypass exhaust gas passage; detection period setting means (ECU 114, S20) for setting a detection period (a first detection period) based on a state of opening/closing the switch-over valve; and valve malfunction determining means (ECU 114, S26, S100–S116) for determining whether the switch-over valve malfunctions based on the detected first temperature during the detection period, more particularly by comparing the detected temperature tmp.in with a predetermined value tmp.out+X.TMP.JUD2.

With this, it becomes possible to detect whether the switch-over valve 60 malfunctions with improved accuracy.

The embodiment is configured to further include: a second temperature sensor 106, installed at the bypass exhaust gas passage 56 at a position opposite to the first temperature sensor 104, sandwiching the adsorbent 74 in between with the first temperature sensor 104, which detects a second temperature (exit temperature tmp.out) at the bypass exhaust gas passage; and wherein the valve malfunction determining means determines whether the switch-over valve malfunctions based on the detected first and second temperatures during the detection period.

In the system, the valve malfunction determining means includes: valve state detecting means (ECU 114, S24) for detecting the opening/closing state of the switch-over valve 60; instruction issuing means (ECU 114, S16, S18, S36 S40) for issuing an instruction to operate the switch-over valve 60 to open/close the bypass exhaust gas passage 56; and state comparing means (ECU 114, S100) for comparing the detected state with a state estimated from the instruction; and wherein the valve malfunction determining means determines if the switch-over valve malfunctions when the detected state is not equal to the estimated state (ECU 114, S102), thereby further improving the detection accuracy.

In the system, the valve malfunction determining means includes: temperature comparing means (ECU 114, S108, S110, S114) for comparing the detected temperature with a threshold value; and wherein the valve malfunction determining means determines whether the switch-over valve malfunctions based on a result of this comparison (ECU 114, S102, S116).

In the system, the detection period setting means sets the detection period in a first period of time during which the bypass exhaust gas passage 56 is opened and in a second period of time during which the bypass exhaust gas passage 56 is closed respectively, and the temperature comparing means compares the detected temperature during the detection period set in the first period of time and the second period of time respectively (ECU 114, S106, S112).

In the system, the valve malfunction determining means determines whether the switch-over valve is stuck in an opening state or an closing state.

The embodiment is configured to have a system for detecting malfunctions of an exhaust switch-over valve 60 of an internal combustion engine 10, for opening/closing a bypass exhaust gas passage 56, branched from an exhaust pipe of the engine, which stores an adsorbent 74 that adsorbs unburned components of the exhaust gas generated by the engine when the engine is started, comprising: a first temperature sensor 104, installed at the bypass exhaust gas passage, which detects a first temperature tmp.in at an entrance of the bypass exhaust gas passage; a second temperature sensor 106, installed at the bypass exhaust gas passage, which detects a second temperature tmp.out at an exit of the bypass exhaust gas passage; instruction issuing means (ECU 114, S16, S18, S36, S40) for issuing an instruction to operate the switch-over valve to close/open the bypass exhaust gas passage; detection period setting means (ECU 114, S20, S22) for setting a first detection period within a first period of time during which the bypass exhaust gas passage is closed in response to the instruction to operate the switch-over valve to open the bypass exhaust gas passage and a second detection period within a second period of time during which the bypass exhaust gas passage is closed in response to the instruction to operate the switch-over valve to close the bypass exhaust gas passage; temperature comparing means (ECU 114, S108, S110, S114) for comparing the first and second detected temperatures with each other within the first and second detection periods; and valve malfunction determining means (ECU 114, S102, S116) for determining whether the switch-over valve malfunctions based on a result of the comparison.

In the system, the valve malfunction determining means includes: valve state detecting means (ECU 114, S24) for detecting a state of opening/closing of the switch-over valve; state comparing means (ECU 114, S100) for comparing the detected state with a state estimated from the instruction; and wherein the valve malfunction determining means determines that the switch-over valve malfunctions when the detected state is not equal to the estimated state (ECU 114, S102).

In the system, the valve malfunction determining means determines whether the switch-over valve is stuck in an opening state or a closing state.

It should be noted in the above that, although the limit switches are provided to determine whether the switch-over valve 60 is opened or closed, it is alternatively possible to provide a similar sensor at the shaft 60e for the same purpose. It is alternatively possible to install an angle sensor to detect the rotational angle of the shaft 60 in such a way that the valve opening/closing is determined from the shaft rotational angle.

It should also be noted that the switch-over valve may be opened or closed by an electric actuator.

It should further be noted that the adsorbent should not be limited to the type disclosed, any other type may be used if it has an excellent heat-proof property.

While the invention has thus been shown and described with reference to specific embodiments, it should be noted that the invention is in no way limited to the details of the described arrangements, changes and modifications may be made without departing from the scope of the appended claims.

What is claimed is:

1. A system for detecting malfunction of an exhaust switch-over valve of an internal combustion engine, for opening/closing a bypass exhaust gas passage, branched from an exhaust pipe of the engine, which stores an adsorbent that adsorbs unburned components of the exhaust gas generated by the engine when the engine is started, comprising:

a first temperature sensor, installed at the bypass exhaust gas passage, which detects a first temperature at the bypass exhaust gas passage;

detection period setting means for setting a detection period based on a state of opening/closing of the switch-over valve; and valve malfunction determining means for determining whether the switch-over valve malfunctions based on the detected first temperature during the detection period.

2. A system according to claim 1, further including:

a second temperature sensor, installed at the bypass exhaust gas passage at a position opposite to the first temperature sensor, sandwiching the adsorbent in between the first and second temperature sensors, which detects a second temperature at the bypass exhaust gas passage; and wherein the valve malfunction determining means determines whether the switch-over valve malfunctions based on the detected first and second temperatures during the detection period.

3. A system according to claim 1, wherein the valve malfunction determining means includes:

valve state detecting means for detecting the opening/closing state of the switch-over valve;

instruction issuing means for issuing an instruction to operate the switch-over valve to open/close the bypass exhaust gas passage; and state comparing means for comparing the detected state with a state estimated from the instruction; and wherein the valve malfunction determining means determines that the switch-over valve malfunctions when the detected state is not equal to the estimated state.

4. A system according to claim 1, wherein the valve malfunction determining means includes:

temperature comparing means for comparing the detected temperature with a threshold value; and wherein the valve malfunction determining means determines whether the switch-over valve malfunctions based on a result of the comparison.

5. A system according to claim 4, wherein the detection period setting means sets the detection period in a first period of time during which the bypass exhaust gas passage is opened and in a second period of time during which the bypass exhaust gas passage is closed respectively, and the temperature comparing means compares the detected temperature during the detection period set in the first period of time and the second period of time respectively.

6. A system according to claim 2, wherein the valve malfunction determining means includes:

temperature comparing means for comparing the detected temperature with a threshold value; and wherein the valve malfunction determining means determines whether the switch-over valve malfunctions based on a result of the comparison.

7. A system according to claim 6, wherein the detection period setting means sets the detection period in a first period of time during which the bypass exhaust gas passage is opened and in a second period of time during which the bypass exhaust gas passage is closed respectively, and the temperature comparing means compares the detected temperature during the detection period set in the first period of time and the second period of time respectively.

8. A system according to claim 3, wherein the valve malfunction determining means includes:

temperature comparing means for comparing the detected temperature with a threshold value; and wherein the valve malfunction determining means determines whether the switch-over valve malfunctions based on a result of the comparison.

9. A system according to claim 8, wherein the detection period setting means sets the detection period in a first period of time during which the bypass exhaust gas passage is opened and in a second period of time during which the bypass exhaust gas passage is closed respectively, and the temperature comparing means compares the detected temperature during the detection period set in the first period of time and the second period of time respectively.

10. A system according to claim 1, wherein the valve malfunction determining means determines whether the switch-over valve is stuck in an opening state or a closing state.

11. A system for detecting malfunctions of an exhaust switch-over valve of an internal combustion engine, for opening/closing a bypass exhaust gas passage, branched from an exhaust pipe of the engine, which stores an adsorbent that adsorbs unburned components of the exhaust gas generated by the engine when the engine is started, comprising:

a first temperature sensor, installed at the bypass exhaust gas passage, which detects a first temperature at an entrance of the bypass exhaust gas passage;

a second temperature sensor, installed at the bypass exhaust gas passage, which detects a second temperature at an exit of the bypass exhaust gas passage;

instruction issuing means for issuing an instruction to operate the switch-over valve to close/open the bypass exhaust gas passage;

detection period setting means for setting a first detection period within a first period of time during which the bypass exhaust gas passage is closed in response to the instruction to operate the switch-over valve to open the bypass exhaust gas passage and a second detection period within a second period of time during which the bypass exhaust gas passage is closed in response to the instruction to operate the switch-over valve to close the bypass exhaust gas passage;

temperature comparing means for comparing the first and second detected temperatures to each other within the first and second detection periods; and valve malfunction determining means for determining whether the switch-over valve malfunctions based on a result of the comparison.

12. A system according to claim 11, wherein the valve malfunction determining means includes:

valve state detecting means for detecting a state of opening/closing of the switch-over valve;

state comparing means for comparing the detected state with a state estimated from the instruction; and wherein the valve malfunction determining means determines that the switch-over valve malfunctions when the detected state is not equal to the estimated state.

13. A system according to claim 11, wherein the valve malfunction determining means determines whether the switch-over valve is stuck in an opening state or a closing state.

14. A method of detecting malfunctions of an exhaust switch-over valve of an internal combustion engine, for opening/closing a bypass exhaust gas passage, branched from an exhaust pipe of the engine, which stores an adsorbent that adsorbs unburned components of the exhaust gas generated by the engine when the engine is started, comprising the steps of:

(a) detecting a first temperature at the bypass exhaust gas passage;

(b) setting means for setting a detection period based on a state of opening/closing the switch-over valve; and (c) determining whether the switch-over valve malfunctions based on the first detected temperature during the detection period.

15. A method according to claim 14, further including the step of:

(d) detecting a second temperature at the bypass exhaust gas passage; and wherein step (c) determines whether the switch-over valve malfunctions based on the first and second detected temperatures during the detection period.

16. A method according to claim 14, wherein step (c) includes the steps of:

(e) detecting the opening/closing state of the switch-over valve;

(f) issuing an instruction to operate the switch-over valve to open/close the bypass exhaust gas passage; and (g) comparing the detected state with a state estimated from the instruction; and wherein step (c) determines that the switch-over valve malfunctions when the detected state is not equal to the estimated state.

17. A method according to claim 14, wherein step (c) includes the step of:

(h) comparing the detected temperature with a threshold value; and wherein step (c) determines whether the switch-over valve malfunctions based on a result of the comparison.

18. A method according to claim 16, wherein step (b) detection sets the detection period in a first period of time during which the bypass exhaust gas passage is opened and in a second period of time during which the bypass exhaust gas passage is closed respectively, and step (h) compares the detected temperature during the detection period set in the first period of time and the second period of time respectively.

19. A method according to claim 15, wherein step (c) includes the step of:

(i) comparing the detected temperature with a threshold value; and wherein step (c) determines whether the switch-over valve malfunctions based on a result of the comparison.

20. A method according to claim 19, wherein step (b) sets the detection period in a first period of time during which the bypass exhaust gas passage is opened and in a second period of time during which the bypass exhaust gas passage is closed respectively, and step (i) compares the detected temperature during the detection period set in the first period of time and the second period of time respectively.

21. A method according to claim 16, wherein step (c) includes the step of:

(j) comparing the detected temperature with a threshold value; and wherein step (c) determines whether the switch-over valve malfunctions based on a result of the comparison.

22. A method according to claim 21, wherein step (b) sets the detection period in a first period of time during which the bypass exhaust gas passage is opened and in a second period of time during which the bypass exhaust gas passage is closed respectively, and step (j) compares the detected temperature during the detection period set in the first period of time and the second period of time respectively.

23. A method according to claim 14, wherein step (c) determines whether the switch-over valve is stuck in an opening state or a closing state.

24. A method of detecting malfunctions of an exhaust switch-over valve of an internal combustion engine, for opening/closing a bypass exhaust gas passage, branched from an exhaust pipe of the engine, which stores an adsorbent that adsorbs unburned components of the exhaust gas generated by the engine when the engine is started, comprising:

(a) detecting a first temperature at an entrance of the bypass exhaust gas passage;

(b) detecting a second temperature at an exit of the bypass exhaust gas passage;

(c) issuing an instruction to operate the switch-over valve to close/open the bypass exhaust gas passage;

(d) setting a first detection period within a first period of time during which the bypass exhaust gas passage is closed in response to the instruction to operate the switch-over valve to open the bypass exhaust gas passage and a second detection period within a second period of time during which the bypass exhaust gas passage is closed in response to the instruction to operate the switch-over valve to close the bypass exhaust gas passage;

(e) comparing the first and second detected temperatures with each other within the first and second detection periods; and (f) determining whether the switch-over valve malfunctions based on a result of the comparison.

25. A method according to claim 24, wherein step (f) includes the steps of:

(g) detecting a state of opening/closing the switch-over valve;

(h) comparing the detected state with a state estimated from the instruction; and wherein the step (f) determines that the switch-over valve malfunctions when the detected state is not equal to the estimated state.

26. A method according to claim 24, wherein step (f) determines whether the switch-over valve is stuck to an opening state or an closing state.

* * * * *